(12) United States Patent
Dooley

(10) Patent No.: US 6,313,560 B1
(45) Date of Patent: Nov. 6, 2001

(54) THERMALLY PROTECTED ELECTRIC MACHINE

(75) Inventor: Kevin Allan Dooley, Mississauga (CA)

(73) Assignee: Pratt & Whitney Canada Corp., Longueil (CA)

( * ) Notice: Subject to any disclaimer, the term of this patent is extended or adjusted under 35 U.S.C. 154(b) by 0 days.

(21) Appl. No.: 09/467,761

(22) Filed: Dec. 20, 1999

(51) Int. Cl.$^7$ .............................. H02K 1/12; H02K 1/100; H02K 47/04
(52) U.S. Cl. ............................. 310/259; 310/113; 310/216
(58) Field of Search .................................. 310/46, 52, 66, 310/68 C, 254, 258, 259, 112, 113, 216, 217, 218, 191, 209

(56) References Cited

U.S. PATENT DOCUMENTS

| | | | |
|---|---|---|---|
| 3,812,441 | 5/1974 | Sakamoto et al. | 335/208 |
| 3,961,211 * | 6/1976 | Vergues | 310/68 C |
| 4,237,395 * | 12/1980 | Loudermilk | 310/113 |
| 4,250,128 | 2/1981 | Meckling | 264/24 |
| 4,392,072 * | 7/1983 | Rosenberry | 310/216 |
| 4,401,906 | 8/1983 | Isobe et al. | 310/156 |
| 4,445,061 * | 4/1984 | Jackson, Jr. | 310/156 |
| 4,547,713 * | 10/1985 | Langley et al. | 318/254 |
| 4,562,399 * | 12/1985 | Fisher | 322/94 |
| 4,605,874 | 8/1986 | Whiteley | 310/268 |
| 4,897,570 * | 1/1990 | Ishikawa et al. | 310/154 |
| 5,184,040 * | 2/1993 | Lim | 310/114 |
| 5,235,231 * | 8/1993 | Hisey | 310/259 |
| 5,397,948 | 3/1995 | Zoerner et al. | 310/46 |
| 5,555,722 * | 9/1996 | Mehr-Ayin et al. | 60/39.142 |
| 5,742,106 * | 4/1998 | Muraji | 310/36 |
| 5,834,874 * | 11/1998 | Krueger et al. | 310/191 |
| 5,907,202 * | 5/1999 | Muraji | 310/36 |
| 5,917,248 * | 6/1999 | Seguchi et al. | 290/31 |
| 6,100,620 * | 8/2000 | Radovsky | 310/268 |
| 6,114,784 * | 9/2000 | Nakano | 310/59 |

FOREIGN PATENT DOCUMENTS

| | | |
|---|---|---|
| 1671038 | 10/1971 | (DE) . |
| 617264 | 9/1994 | (EP) . |
| 836007 | 4/1998 | (EP) . |
| 2007922 | 5/1979 | (GB) . |
| 2130806 | 6/1984 | (GB) . |

* cited by examiner

*Primary Examiner*—Nestor Ramirez
*Assistant Examiner*—Dang Dinh Le
(74) *Attorney, Agent, or Firm*—Jeffrey W. Astle

(57) ABSTRACT

An electric machine including a magnetic component, forming part of its rotor or stator that loses its magnetic characteristics above a certain chosen temperature is disclosed. This magnetic material forms part of a magnetic circuit that guides flux about the stator. As a result, any magnetic flux emanating with the rotor stops circulating about the stator above this temperature, and the machine stops acting as generator. The component is thermally coupled to windings carrying current from the machine's stator. The material forming the component is selected so that the chosen temperature is lower than the temperature at which the machine would be thermally damaged. This, in turn, limits the operating temperature of the windings, and thus prevents overheating of the machine during operation, typically caused by a fault. Preferably this magnetic material is formed from a ferrite material, such as a Manganese Zinc ferrite material.

16 Claims, 5 Drawing Sheets

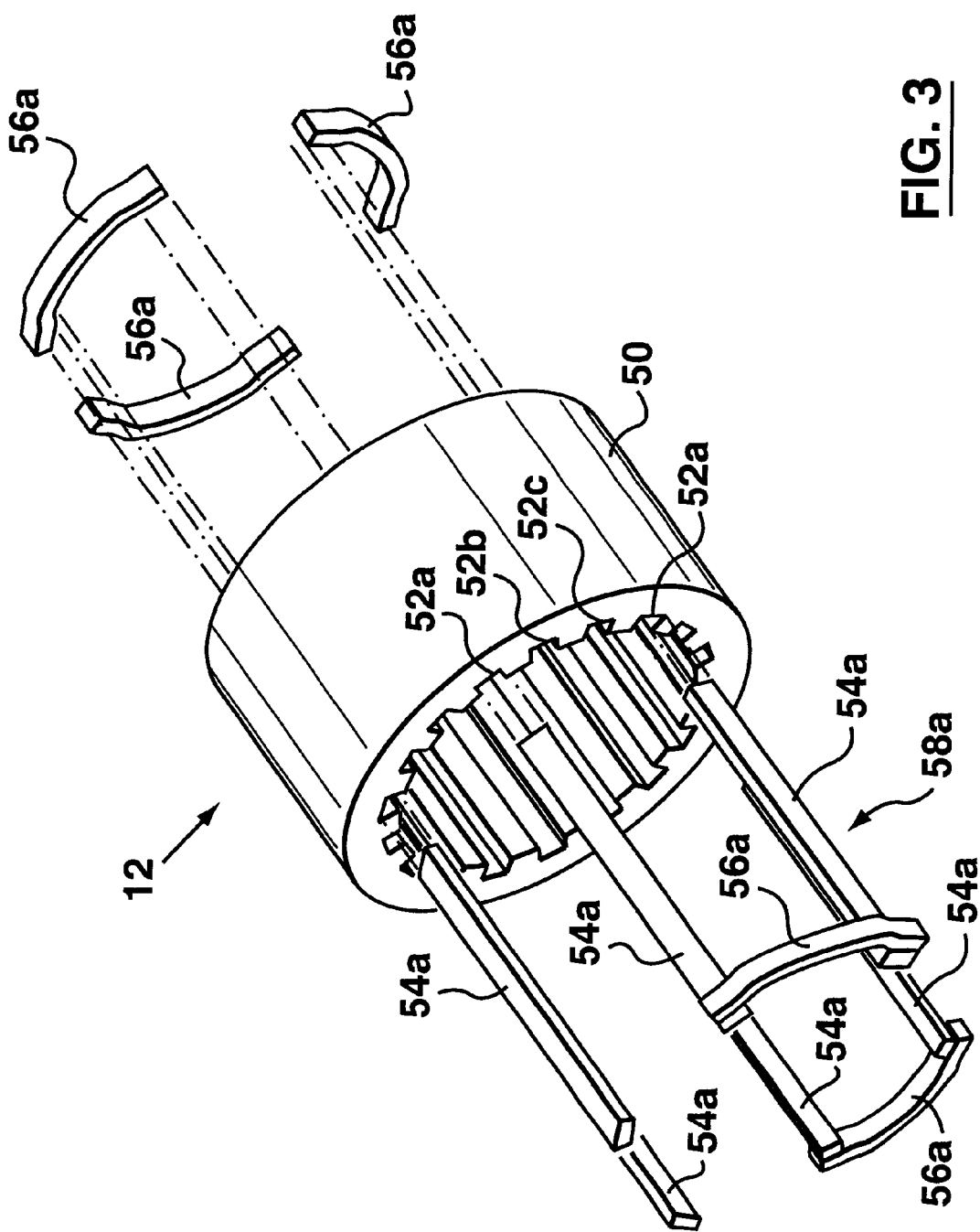

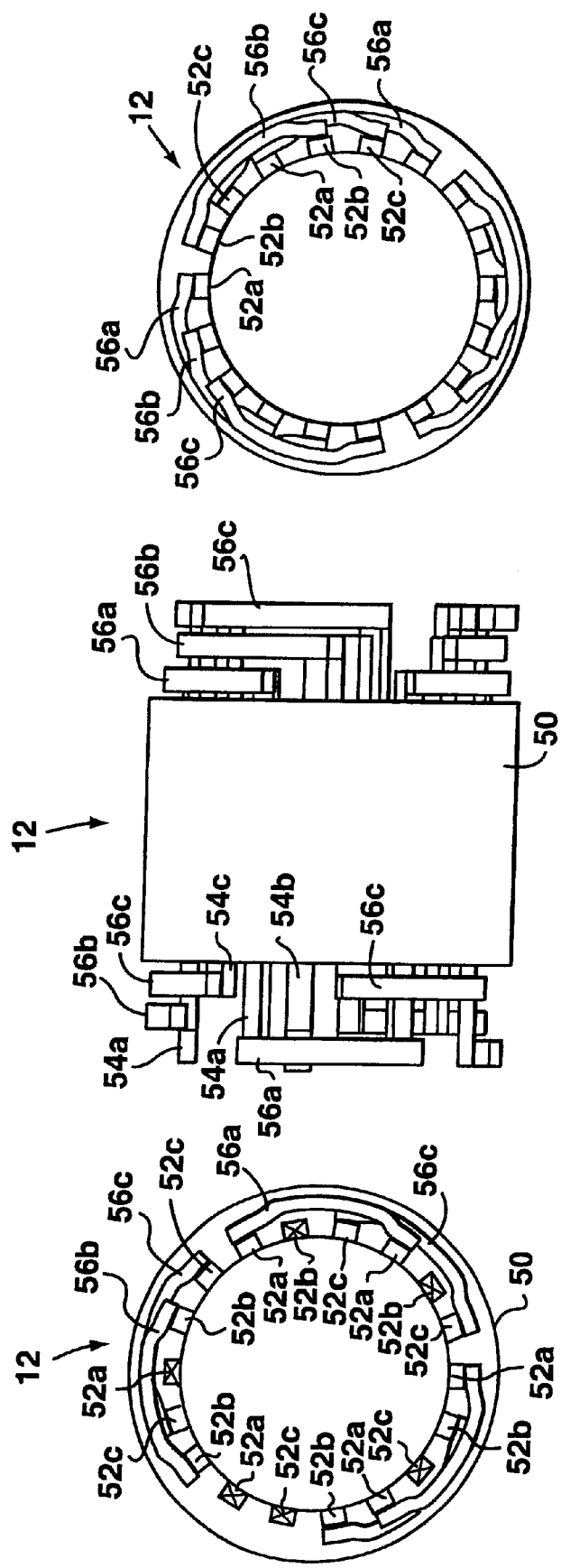

THERMALLY PROTECTED ELECTRIC MACHINE

FIELD OF THE INVENTION

The present invention relates to electric machines, and more particularly to electric generators that are thermally protected from damage resulting from high currents in such machines.

BACKGROUND OF THE INVENTION

Permanent magnet electric motors and generators are well known and understood. Typically, such permanent magnet machines include a rotor formed, at least in part, from a magnetic material such as Samarium-Cobalt. Electric windings on a stator about the rotor are used to carry current that either generates a magnetic field or is the result of a magnetic field about the rotor. As a motor, current through the windings induces the rotating magnetic field, which in turn applies a torque to the magnetic portion of the rotor causing it to act as motor. Similarly, as a generator, torque applied to the rotor, results in a rotating magnetic field that induces a current in the windings.

Such electric machines provide significant benefits over synchronous machines, squirrel cage motors and other types of electric machines. Significantly, permanent magnet machines do not require brushes; are relatively light; use conventional and developed electronics to generate any required rotating magnetic field; and can act as both motors and generators.

In view of these benefits, such machines appear well suited for aircraft applications. Particularly, such machines would appear to lend themselves for use as starters and generators within a turbine engine.

Conveniently, such machines can be connected directly to the engine shaft. When required, generated electricity can be rectified and filtered using conventional lightweight electronics. When DC currents are required, as in traditional aircraft applications, the speed of rotation and frequency of generator output does not need be controlled. Heavy gearing is therefore not required. Operating as motors, such machines can act as starters.

Disadvantageously, however, machines coupled to such engines can potentially generate extreme power limited only by the power of the turbine engine driving the rotor of the machine. Unabated, generation of such electric power can result in extreme heat, particularly in the stator windings, that may cause the motor to melt and potentially burn. This is clearly undesirable. Obviously, current provided by the machine to interconnected electrical equipment may be limited by fusing the interconnected equipment or even the electronics used to rectify or regulate AC currents. However, such fusing will not react to short circuits internal to the machine. While unlikely, such short circuits might, for example, occur in the stator windings. Should this happen, a permanent magnet machine will invariably overload and overheat causing damage to the machine, and perhaps even to the associated engine. In the extreme case, this may cause the main engine to fail as a result of the high temperature of the engine shaft coupled to the motor. Similar problems may be manifested in other types of electric machines.

Accordingly, an improved electric machine that is thermally protected is desirable.

SUMMARY OF THE INVENTION

In accordance with the present invention, an electric machine includes a ferrite portion, forming part of its rotor or stator that loses its magnetic characteristics above a certain chosen temperature. As a result, any magnetic flux circulating between the rotor and stator is significantly reduced above this temperature, and the machine stops acting as generator. The component is thermally coupled to windings carrying current from the machine's stator. The material forming the component is selected so that the certain temperature is lower than the temperature at which the machine would be thermally damaged. This, in turn, limits the operating temperature of the windings, and thus preventing overheating of the machine during operation.

In accordance with an aspect of the present invention an electric machine includes a permanent magnet motor and a stator mounted about the rotor, at least partially forming a magnetic circuit guiding a magnetic flux emanating from the permanent magnet. At least one winding extends about the stator for picking up a current induced by the magnetic flux. At least a portion of the magnetic circuit is thermally coupled to the winding and is formed from magnetic material having a Curie temperature below a temperature at which the machine is damaged. This limits the magnetic flux about the magnetic circuit above the Curie temperature, and thus limits the operating temperature of the windings, and prevents overheating of the machine during operation.

In accordance with another aspect of the invention, an electric generator includes a rotor assembly including a permanent magnet; and a stator formed of a ferrite material mounted about the rotor, at least partially forming a magnetic circuit guiding a magnetic field emanating from the permanent magnet. At least one winding extends about the stator for picking up a current induced by the magnetic field. Preferably, the ferrite material is a Manganese-Zinc ferrite material.

Other aspects and features of the present invention will become apparent to those of ordinary skill in the art, upon review of the following description of specific embodiments of the invention in conjunction with the accompanying figures.

BRIEF DESCRIPTION OF THE DRAWINGS

In figures which illustrate, by way of example only, preferred embodiments of the invention.

FIG. 3 is an exploded view of a partial stator assembly that may form part of the machine of FIG. 1;

FIG. 4 is a side perspective view of an exemplary stator assembly forming part of the machine of FIG. 1;

FIG. 5 is a back end view of FIG. 4;

FIG. 6 is a front end view of FIG. 4;

DETAILED DESCRIPTION

Figure 1:
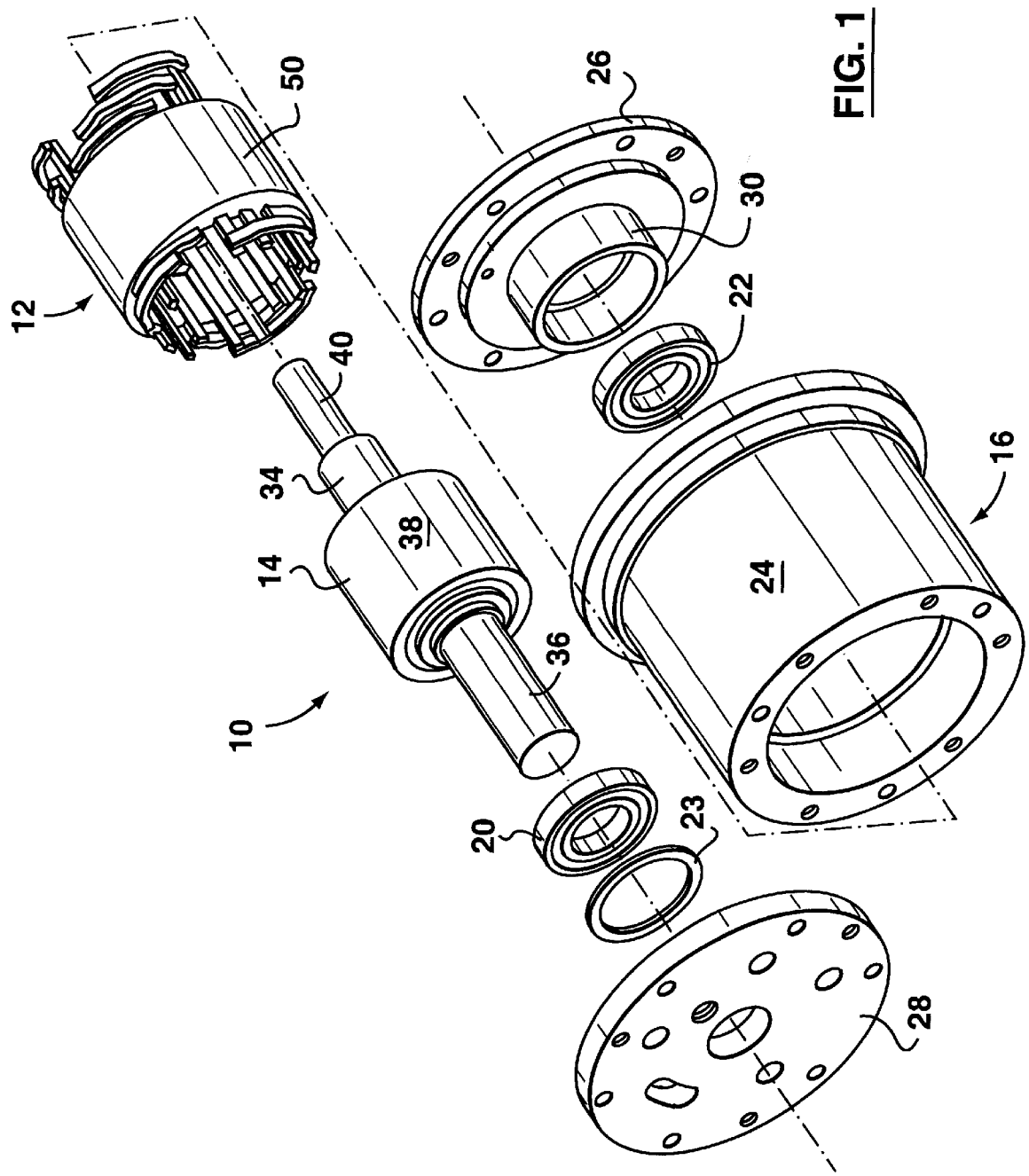
FIG. 1 is an exploded view of a permanent magnet machine, exemplary of an embodiment of the present invention.
Figure 2:
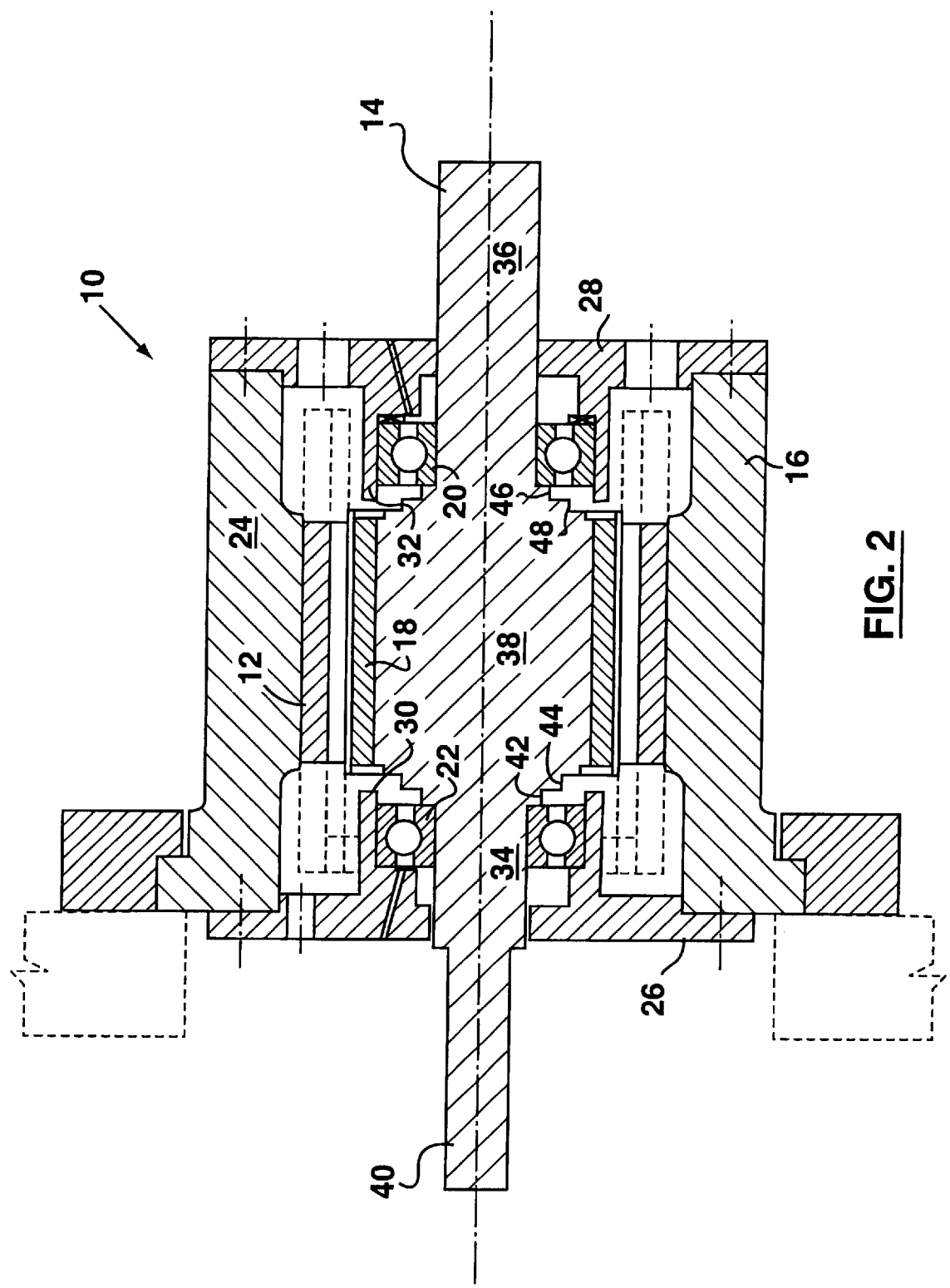
FIG. 2 is a cross sectional view of the machine of FIG. 1.

FIGS. 1 and 2 illustrate a permanent magnet electric machine 10, exemplary of an embodiment of the present invention. As illustrated, electric machine 10 includes a stator assembly 12 and rotor assembly 14, preferably mounted within a housing 16. Rotor assembly 14 is mounted for free rotation about its central axis within housing 16 by bearings 20 and 22.

Housing 16 includes an outer cylindrical shell 24, and generally disc shaped front and rear end plates 26 and 28. End plates 26 and 28 are fixed to shell 24, and thereby retain stator assembly 12, rotor assembly 14, and bearings 20 and 22 within housing 16. Annular walls 30 and 32 extend inwardly from the interior of end plates 26 and 28 and retain bearings 20 and 22 at defined axial positions within housing 16, about rotor assembly 14. A further retaining washer 23 assists to retain bearings 20 and 22. Housing 16 is preferably formed of high-grade stainless steel.

Example rotor assembly 14 includes a generally cylindrical core section 38. Two smaller diameter cylindrical shafts 34 and 36 extend axially outward from core section 38, toward the front and rear of housing 16, respectively. Spacing ledges 42, 44 and 46, 48 separate shafts 34 and 36, respectively, from core section 38. Ledges 42 and 46 abut with bearings 20 and 22. A further smaller diameter concentric drive shaft 40 extends axially outward from shaft 34 and the front of housing 16. As will be appreciated, core section 38; shafts 34, 36 and 40 are preferably machined from a single piece of relatively low strength magnetic steel, such as maraging steel. A thin shell 18 formed of non-magnetic material, such as a Nickle alloy, at least partially encapsulates core section 38 and contains the relatively low strength magnetic steel. Shell 18 is preferably formed of AMS 5662 or AMS 5663 Nickel Alloy and may be shrink fitted to the core portion 38 and then ground to achieve a desired overall thickness of shell 18.

Figure 7:
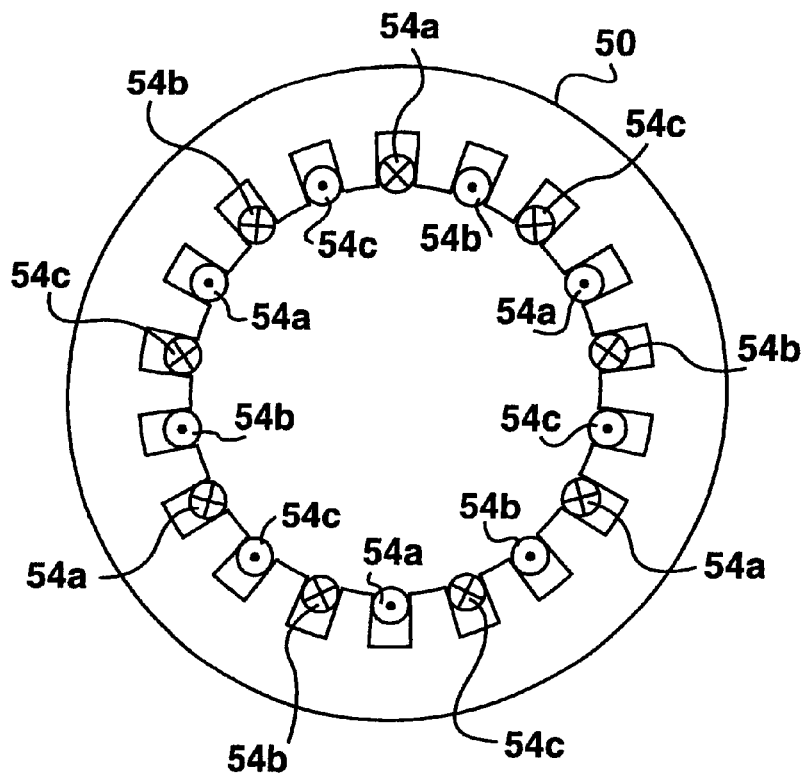
FIG. 7 schematically illustrates the flow of current about the stator assembly of FIG. 4.

Stator assembly 12 is further illustrated in FIGS. 3–7. As illustrated, stator assembly 12 includes a magnetic circuit defined by an exemplary hollow cylinder 50. Cylinder 50 includes a plurality of lengthwise extending, evenly spaced slots 52a, 52b and 52c (collectively slots 52) extending on its interior. In the preferred embodiment, a total of eighteen such slots extend along the cylinder's length. Conveniently, the eighteen slots 52a, 52b and 52c may be grouped into three groups, with all slots 52a belonging to one group, all slots 52b and 52c to another. Each third slot belongs in one of the groups. As best illustrated in FIG. 3, a set of six rectangular conductors 54a that are complementary in shape to slots 52a, occupy the entire length of these slots. Each of these conductors is formed of a material such as copper, and is insulated by a thin plastic coating. Each of conductors 54a is identical in length, and extends slightly beyond the ends of cylinder 50. Adjacent conductors within the group of conductors 54a are interconnected by arced conductors 56a extending radially about the central axis of cylinder 50, and exterior to cylinder 50. Alternating pairs of conductors 54a are connected at opposite ends of cylinder 50. Thus, two arced conductors 56a are at one end of cylinder 50 and three are at the opposite. Conductors 54a and 56a thus form an electric circuit (referred to as circuit 58a) traversing the length of cylinder 50 six times, at intervals spaced sixty degrees about a central axis of cylinder 50. Diametrically opposed rectangular conductors (ie. spaced by one-hundred and eighty degrees) have currents running in opposite direction along the length of cylinder 50 and thus form current loops or windings about the central axis of machine 10. As illustrated in FIGS. 4–6, conductors 54b, 56b and 54c, 56c are similarly arranged to occupy the remaining slots 52b and 52c, and thus form circuits 58b and 58c. Resulting circuits 58a, 58b and 58c (collectively circuits 58) thus form nine current loops or windings about central axis of machine 10. As illustrated in FIG. 6, conductors 54b and 54c have the same length as conductors 54a and are arranged at axial positions so that conductors 54a, 54b, 54c (collectively conductors 54) and 56a, 56b and 56c (collectively conductors 56) are not in contact with each other. Moreover, these conductors are preferably insulated so that they are not electrically connected with cylinder 50, and are thermally coupled to cylinder 50. The conductors may be coupled to cylinder 50 by way of a known thermal conductive varnish or epoxy. Cylinder 50 and conductors 54 may be encapsulated using this varnish or epoxy. Contact points for each circuit 58a, 58b and 58c extend from the rear end of cylinder 50, as illustrated in FIG. 5. Current flow in circuits 58a, 58b and 58c as viewed at the rear of machine 10, resulting from a potential difference across the contact points is schematically illustrated in FIG. 7.

As illustrated, stator assembly 12 and cylinder 50 are coaxial with core section 38. A small air gap separates core section 38 from cylinder 50.

A conventional three phase circuit (not shown) may be used to drive circuits 58a, 58b and 58c to cause machine 10 to act as a motor. Specifically, driving circuits 58 results in a rotating magnetic field generated by the nine windings or current loops, travelling circumferentially within cylinder 50. This field is guided by cylinder 50 acting as part of a magnetic circuit about the center axis of this cylinder 50, and in turn the core section 38 of rotor assembly 14. As will be appreciated by those of ordinary skill in the art, the rotating magnetic field exerts a torque on the magnetic portion of rotor assembly 14, causing it to rotate.

Cylinder 50 is preferably formed of a ferrite material. As is understood by those of ordinary skill in the art, ferrite materials exhibit magnetic properties and have high relative permeability resulting in low magnetic reluctance, allowing such materials to guide magnetic flux. Ferrites typically have cubic crystalline structure with the chemical formula $MO.Fe_2O_3$, where MO is typically a combination of two or more divalent metals, such as zinc, nickel, manganese or copper. Ferrites are typically classified as "hard" or "soft". "Soft" ferrite materials only exhibit significant magnetic characteristics in the presence of a magnetic field, while "hard" ferrite materials tend to permanently retain their magnetic characteristics. As is further, understood, the nature of most magnetic materials is typically temperature dependent. Most magnetic materials lose their magnetic properties above a critical temperature, referred to as the Curie temperature of the material. For many materials, and for most ferrites, once the temperature of the material drops below the critical temperature, their magnetic properties return. Iron, for example, has a Curie temperature of about 770° C. In fact, most magnetic materials used in electric machines have Curie temperature far exceeding the operating temperature of the machine. In machine 10, however, cylinder 50 and hence the magnetic circuit defined by cylinder 50 is formed of a material (preferably a ferrite) having a Curie temperature above conventional operating temperatures, but below a critical temperature at which damage might be caused to the circuits 58 or the remainder of machine 10. For reasons that will become apparent, this Curie temperature may be considered to be the desired shut-down temperature of machine 10. Preferably, cylinder 50 is formed of a "soft" ferrite having a Curie temperature of approximately 200° C. A ferrite having such property is, for example, a ManganeseZinc available from Phillips under material type 3C85, having a Curie temperature of 215° C. Of course, other materials may be suitable, and will be easily identified by those of ordinary skill in the art. Preferably the material will have a Curie temperature between 95° C. and 300° C. depending on the desired shut-down temperature. Of course, some machine designs may require lower or higher shut-down temperatures.

In operation then, circuits 58 may be driven by a three-phase power source, as describe above, causing machine 10 to act as a motor. Instead of using an alternating current three-phase power source, each of circuits 58a, 58b and 58c may be driven by a square wave source, with each square way source out of phase with another square wave source by 120°. As will be appreciated, this has the same effect of using a poly-phase AC source, driving rotor assembly 14.

More significantly, however, machine 10 may be operated as a generator by driving shaft 40 using a rotational source of mechanical power. For example, shaft 40 may be interconnected with the power shaft of a gas turbine engine, and driven at very high speeds (potentially in excess of 100,000 rpm). As will be appreciated, rotating rotor assembly 14, and more particularly magnetic shell 18 will generate a rotating magnetic field about the central axis of rotor assembly 14. This, in turn, establishes an alternating magnetic flux in the magnetic circuit defined by cylinder 50. This flux, in turn, induces an electric current in the windings defined by circuits 58a, 58b and 58c. As will be appreciated, the current so generated will be three-phase current, having a frequency proportional to the speed of rotation of rotor assembly 14, with current through circuits 58a, 58b and 58c being out of phase with each other by 120°. If desired, this current may be rectified using a conventional rectification circuit (also not shown).

Now, in the event machine 10 is subject to an internal fault, such as for example, caused by a short across conductors 54 or 56, current in the conductors will increase, resulting in increased heat in the conductors. Moreover, as conductors 54, and 56 are preferably in physical contact with, and thermally coupled to cylinder 50, increase in temperature of conductors 54 or 56 will be transferred to cylinder 50. As the temperature of cylinder 50 approaches the Curie temperature of the material forming cylinder 50, cylinder 50 loses its magnetic properties, thereby severely limiting the flux through cylinder 50 and the current induced in the windings formed by circuits 58, and effectively shutting down machine 10 acting as a generator. Clearly, as the current is reduced, the temperature of the conductors is reduced until the temperature of cylinder 50 again drops below the Curie temperature of the material and its magnetic properties return. As will be apparent, in steady state and in the presence of a fault, machine 10 will operate with cylinder 50 at or near the selected shut-down or Curie temperature. Clearly, for a properly chosen Curie temperature, cylinder 50 acts as temperature activated fuse, limiting the operating temperature of machine 10, and thereby any damage to its components.

Additionally, the use of ferrite material in the formation of stator assembly 12 advantageously reduces Hysteresis and Eddy current losses within stator assembly 12. This becomes particularly beneficial at high speeds.

In yet another embodiment, rotor assembly 14 may include a material having the desired shut-down Curie temperature. Preferably, a ferrite material is placed radially outward of magnets forming part of rotor assembly 14, effectively as part of the magnetic circuit formed coupling the flux from rotor assembly 14 to stator assembly 12. Cylinder 50 may be formed of a material having a much higher Curie temperature. The ferrite material on rotor assembly 14 may then be thermally coupled to the conductors forming circuits 58. These conductors, could for example, be coupled to rotor assembly 14 by radiation or convection. In the event that the temperature of these conductors increases, the increase in temperature is conducted to the ferrite portion of the rotor assembly 14, thereby causing the ferrite material to lose its magnetic properties near the Curie temperature. This results in a portion of the magnetic circuit about the magnets of rotor assembly 14 having a very low permeability, thereby reducing the magnetic flux emanating with rotor assembly and coupled to cylinder 50; the resulting flux in cylinder 50; and the resulting current in circuits 58. Again, at steady state this second embodiment will operate with the temperature of the windings and rotor at or near the selected shut-down or Curie temperature.

Figure 8:
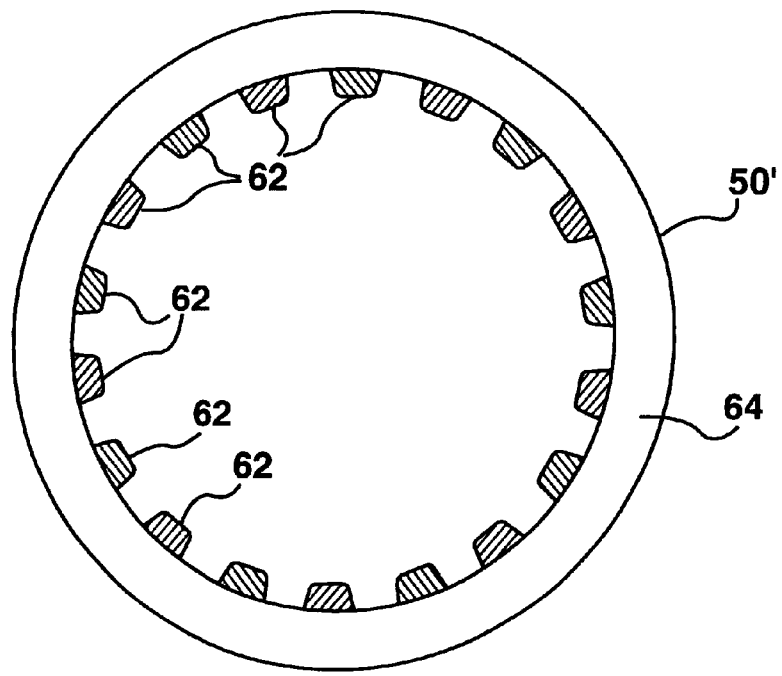
FIG. 8 is a top view of a portion of a further stator that may be used with a machine exemplary of a further embodiment of the present invention.

In a further embodiment, a cylinder 50' illustrated in FIG. 8 may form part of a machine that is otherwise identical to machine 10, may be formed of more than one material. A portion 62 of the cylinder 50, is preferably formed of ferrite material having the desired shut-down Curie temperature, and the remaining portion 64 of the cylinder formed of a material having a different Curie temperature. For example the toothed portion (ie. the lengthwise extending teeth or ridges) of cylinder 50' may be formed of laminated iron, while the remainder of cylinder 50' may be formed of Manganese-Zinc having a Curie temperature of about 200° C. Individual iron teeth or ridges may be epoxied to a Manganese-Zinc portion. Above the Curie temperature, the resulting magnetic circuit would have a very high reluctance, severely limiting the magnetic flux guided about rotor assembly 14, and therefore the current through windings about the cylinder 50', again causing cylinder 50' to operate at or near the chosen Curie temperature. Of course, other configurations of cylinder 50' having other portions formed of a magnetic material having the desired Curie temperature will be readily apparent to those of ordinary skill in the art.

Clearly, the above embodiments may be modified in many ways while still embodying the invention. For example, the shape of cylinder 50 could be modified—a toroid or other shape could take its place; the arrangements of conductors and windings could be changed in any number of known ways; the permanent magnet of rotor assembly 14 can be formed in numerous ways; and the size of the machine can be scaled (increased or decreased) as required; other magnetic materials having suitable Curie temperature may be used. Thus it is apparent that the described invention may be embodied in many ways. As further examples, the invention could be embodied in a salient pole DC machine; or in a synchronous machine.

The above described embodiments, are intended to be illustrative only and in no way limiting. The described embodiments of carrying out the invention, are susceptible to many modifications of form, size, arrangement of parts, and details of operation. The invention, rather, is intended to encompass all such modification within its scope, as defined by the claims.

What is claimed is:

1. An electric machine operable as a generator comprising:
    a magnetic rotor;
    a stator mounted about said rotor, at least partially forming a magnetic circuit guiding magnetic flux emanating from said rotor; at least one winding about said stator at least partially forming an electric circuit for picking up a current induced by said magnetic flux;
    wherein at least a portion of said magnetic circuit is thermally coupled to said winding and is formed from magnetic material having a Curie temperature below a temperature at which said machine is damages so that a short circuit in said electric circuit heating said winding above said Curie temperature heats said portion above said Curie temperature, thereby limiting flow of said magnetic flux about said magnetic circuit, limiting operating temperature of said winding, and preventing thermal damage to said machine and said winding in the presence of said short circuit.

2. The machine of claim 1, wherein said rotor comprises a permanent magnet.

3. The machine of claim 2, wherein said portion is formed of a ferrite material.

4. The machine of claim 3, wherein said stator comprises a cylinder about said rotor, formed of said ferrite material.

5. The machine of claim 4, wherein said ferrite material is a Manganese-Zinc ferrite material.

6. The machine of claim 1, wherein said Curie temperature is between 95 and 300 degrees Celsius.

7. The machine of claim 1, wherein said winding is thermally coupled to said stator by a thermally conductive compound.

8. The machine of claim 1, wherein said portion is formed on said rotor to limit said flux above said Curie temperature.

9. An electric generator comprising:

a rotor assembly comprising a permanent magnet;

a stator formed of a ferrite material mounted about said rotor assembly, at least partially forming a magnetic circuit guiding a magnetic field emanating from said permanent magnet, said ferrite material having a Curie temperature below a temperature at which said generator is damaged;

at least one winding about said stator partially forming an electric circuit for picking up a current induced by said magnetic field, said winding thermally coupled to said stator so that a short circuit in said electric circuit heating said winding above said Curie temperature heats said siator above said Curie temperature and limits flow of said magnetic field about said magnetic circuit, thereby limiting operating temperature of said winding, and preventing thermal damage to said generator and said winding in the presence of said short circuit;

said generator operating in thermal shutdown, with said stator heated by said winding to a temperature approximating said Curie temperature, said stator thereby limiting flow of said magnetic field about said magnetic circuit and preventing thermal damage to said generator and said winding.

10. The electric generator of claim 9, wherein said ferrite material comprises a Manganese-Zinc ferrite material.

11. An electric generator operating in thermal shutdown, said generator comprising:

a magnetic rotor;

a stator about mounted about said rotor, at least partially forming a magnetic circuit guiding magnetic flux emanating from said rotor;

at least one winding about said stator for picking up a current induced by said magnetic flux, said winding forming part of an electric circuit;

wherein at least a portion of said magnetic circuit is thermally coupled to said winding and is formed from magnetic material having a Curie temperature below a temperature at which said generator is damaged, and wherein said material is heated by said winding in the presence of a short circuit in said electric circuit to operate above or at about its Curie temperature, and thereby limit flow of said magnetic flux about said magnetic circuit, limiting operating temperature of said winding, and preventing thermal damage of said winding and said generator.

12. The generator of claim 11, wherein said Curie temperature is between 95 and 300 degrees Celsius.

13. The generator of claim 12, wherein said portion is formed of a ferrite material.

14. The generator of claim 13 wherein said stator comprises a cylinder about said rotor, formed of said ferrite material.

15. The generator of claim 14, wherein said ferrite material is a Manganese-Zinc ferrite.

16. An electric generator comprising:

a rotating rotor assembly comprising a permanent magnet;

a stator formed of a ferrite material mounted about said rotor assembly, at least partially forming a magnetic circuit guiding a magnetic field emanating from said permanent magnet;

at least one winding about said stator forming part of an electric circuit for picking up a current induced by said magnetic field;

said winding thermally coupled to said stator so that a short circuit in said electric circuit heating said winding above a Curie temperature heats said stator above said Curie temperature and limits said magnetic field in said magnetic circuit above said Curie temperature, thereby limiting operating temperature of said winding, and preventing thermal damage to said generator and said winding in the presence of said short circuit;

an induced current in said winding, induced by rotation of said rotor assembly.

* * * * *

UNITED STATES PATENT AND TRADEMARK OFFICE
CERTIFICATE OF CORRECTION

PATENT NO.   : 6,313,560 B1
DATED         : November 6, 2001
INVENTOR(S) : Kevin Allan Dooley It is certified that error appears in the above-identified patent and that said Letters Patent is hereby corrected as shown below:

Column 7,
Line 2, delete "damages" and insert -- damaged --
Line 38, delete "siator" and insert -- stator --

Signed and Sealed this

Seventeenth Day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,313,560 B1
DATED         : November 6, 2001
INVENTOR(S)   : Kevin Allan Dooley It is certified that error appears in the above-identified patent and that said Letters Patent is hereby corrected as shown below:

<u>Column 8,</u>
Line 4, delete "about" (first occurrence)

Signed and Sealed this

Fourth Day of March, 2003

JAMES E. ROGAN
*Director of the United States Patent and Trademark Office*